(12) United States Patent
Horiuchi et al.

(10) Patent No.: US 7,587,887 B2
(45) Date of Patent: Sep. 15, 2009

(54) ADVANCED HUMID AIR TURBINE POWER PLANT

(75) Inventors: Yasuhiro Horiuchi, Hitachinaka (JP); Shinya Marushima, Hitachinaka (JP); Hidefumi Araki, Hitachi (JP); Shigeo Hatamiya, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 455 days.

(21) Appl. No.: 11/167,468

(22) Filed: Jun. 28, 2005

(65) Prior Publication Data

US 2007/0017227 A1    Jan. 25, 2007

(30) Foreign Application Priority Data

Jun. 30, 2004    (JP) .............................. 2004-192457

(51) Int. Cl.
 *F02C 3/30* (2006.01)
 *F02C 7/16* (2006.01)
 *F02C 7/18* (2006.01)
(52) U.S. Cl. .......................... 60/39.3; 60/39.53; 60/806
(58) Field of Classification Search .................. 60/806, 60/39.53, 39.3, 786
 See application file for complete search history.

(56) References Cited

U.S. PATENT DOCUMENTS 5,579,631 A    12/1996    Chen et al.

| | | | |
|---|---|---|---|
| 6,105,362 A * | 8/2000 | Ohtomo et al. | 60/39.182 |
| 6,354,073 B1 * | 3/2002 | Hiramoto et al. | 60/39.182 |
| 6,367,242 B1 * | 4/2002 | Uematsu et al. | 60/39.182 |
| 2001/0003243 A1 * | 6/2001 | Yamamoto et al. | 60/39.182 |
| 2003/0154721 A1 * | 8/2003 | Elwood et al. | 60/772 |

FOREIGN PATENT DOCUMENTS

| | | |
|---|---|---|
| JP | 06-093810 | 4/1994 |
| JP | 07-301127 | 11/1995 |
| JP | 11-159306 | 6/1999 |
| JP | 11-257006 | 9/1999 |

* cited by examiner

*Primary Examiner*—Ted Kim
(74) *Attorney, Agent, or Firm*—Brundidge & Stanger, P.C.

(57) ABSTRACT

An advanced humid air turbine power plant capable of suppressing condensation of moisture in a cooling channel, which is provided to cool a high-temperature component of a gas turbine, in a start up stage, a coast down stage, and a load varying state of the gas turbine. In the advanced humid air turbine power plant comprising a compressed air supply line for supplying compressed air generated by a compressor to the high-temperature component of the gas turbine, and a humidified air supply line for supplying humidified air generated in a humidifying tower to the high-temperature component of the gas turbine, the power plant further comprises valves capable of adjusting respective air flow rates in the compressed air supply line and the humidified air supply line. A coolant is switched over from the compressed air to the humidified air in the start up stage and the load increasing stage of the gas turbine, and from the humidified air to the compressed air in the load decreasing stage and the coast down stage, as well as in the event of an abnormality in a humidifying line.

9 Claims, 8 Drawing Sheets

ADVANCED HUMID AIR TURBINE POWER PLANT

BACKGROUND OF THE INVENTION

1. Field of the Invention

The present invention relates to an advanced humid air turbine power plant including a humidifying line to humidify gas (air) supplied to a gas turbine.

2. Description of the Related Art

In an advanced humid air turbine, combustion gases contain moisture and have a larger heat transfer coefficient and larger specific heat than air due to differences in physical variables therebetween, such as the coefficient of viscosity and the Plandtl number. Therefore, the thermal load in a high-temperature component of the gas turbine, such as a turbine blade, is increased in comparison with an ordinary gas turbine. Correspondingly, the high-temperature component of the gas turbine must be cooled in a stepped-up manner. However, if air cooling is employed as in the ordinary gas turbine, a very large amount of cooling air is required, which results in a lowering of the temperature of a main stream gas and a reduction in thermal efficiency of the gas turbine. For that reason, in the advanced humid air turbine, the high-temperature component of the gas turbine requires to be cooled using a coolant having a higher cooling capability than air, and it is proposed to employ a method of utilizing, as the coolant, a part of humidified air generated in a humidifying tower. Because of containing moisture, the humidified air has a larger heat transfer coefficient and larger specific heat than air and is able to develop a higher cooling capability. As a result, the high-temperature component of the gas turbine can be effectively cooled with a relatively small amount of coolant without requiring additional equipment.

One known technique related to such an advanced humid air turbine (HAT) power plant is disclosed in, for example, JP,A 11-257006. The known technique proposes a cooling method of bleeding, from lines for supplying air and humidified air both used for combustion, the air and the humidified air at a plurality of locations in the respective lines, mixing them to prepare a coolant, and cooling the high-temperature component of the gas turbine with the coolant. As a practical way, the proposed method comprises the steps of bleeding a part of compressed air from a compressor and a part of humidified air from a humidifying tower, mixing them in a mixer, and supplying a mixed coolant to a cooling channel in the gas turbine.

SUMMARY OF THE INVENTION

However, the cooling technique disclosed in the above-cited JP,A 11-257006 does not take into consideration details of the equipment configuration and the operating method, such as what coolant is prepared in what manner in what operating state.

When the humidified air is used as the coolant, the operating state on which attention must be focused with the most important care is a start up stage, a load increasing stage, a load decreasing stage, and a coast down stage of the gas turbine, as well as an abnormal condition of a humidifying line.

In the start up stage and the load increasing stage of the gas turbine, the gas turbine is not sufficiently warmed up. Therefore, if the humidified air in the gas turbine is used as the coolant, this gives rise to a possibility that the metal temperature of the cooling channel in the high-temperature component of the gas turbine may be lower than the dew point of the humidified air, thus resulting in condensation of moisture. The condensed moisture adheres to the cooling channel and evaporates with a rise of temperature, whereupon impurities are accumulated there. The accumulated impurities may cause rotational vibrations or clogging of the cooling channel, and the component may be locally rapidly cooled due to the latent heat of evaporation, thus resulting in erosion.

In the load decreasing stage and the coast down stage of the gas turbine, as the temperature of the gas turbine gradually lowers, there also occur a possibility that the metal temperature of the cooling channel in the high-temperature component of the gas turbine may be lower than the dew point of the humidified air, thus resulting in condensation of moisture. The condensation of moisture may cause, as in the startup stage, rotational vibrations, clogging of the cooling channel, or erosion. Further, if the humidified air remains in the cooling channel after the stop of the gas turbine, moisture and oxygen both contained in the residual humidified air may cause oxidization and corrosion of the component.

In the event of an abnormality in the humidifying line, the humidified air serving as the coolant cannot be supplied in a sufficient amount, thus resulting in a problem that the high-temperature component of the gas turbine is overheated. If the coolant is not supplied to the high-temperature component even for a moment in such an event, the high-temperature component may be damaged.

It is an object of the present invention to provide, in a power system using humidified air as a coolant for cooling a high-temperature component of a gas turbine, an advanced humid air turbine power plant and a method of operating the power plant, which can suppress condensation of moisture in a cooling channel at the time of load variation, startup and stop of the gas turbine, or in the event of an abnormality in a humidifying line.

To achieve the above object, in an advanced humid air turbine power plant comprising a compressed air supply pipe for supplying, as a coolant, a part of compressed air generated by a compressor to a high-temperature component of a gas turbine, and a humidified air supply pipe for supplying, as a coolant, a part of humidified air generated in a humidifying tower to the high-temperature component of the gas turbine, the power plant further comprises valves capable of adjusting respective air flow rates in the compressed air supply pipe and the humidified air supply pipe. With this feature, by supplying the compressed air as the coolant in a start up stage, a load increasing stage, a load decreasing stage and a coast down stage, as well as in the event of an abnormality in a humidifying line, condensation of moisture in the coolant can be suppressed and the high-temperature component of the gas turbine can be cooled without imposing a thermal load on it, thus resulting in higher reliability of the gas turbine.

Also, the power plant of the present invention is featured in opening and closing the valves depending on the rotating speed and load state of the gas turbine, the air temperature at the side of a turbine rotor, and the temperature and humidity of the humidified air measured in the coolant supply pipe. With this feature, when cooling air is switched over from the compressed air to the humidified air or from the humidified air to the compressed air in the start up stage, the load increasing stage, the load decreasing stage and the coast down stage, as well as in the event of an abnormality in the humidifying line, the switching-over of the cooling air can be performed effectively and the reliability of the gas turbine can be increased.

According to the present invention, in the advanced humid air turbine power plant, it is possible to suppress condensation of moisture in a cooling channel, which is provided to cool the high-temperature component of the gas turbine, in the start up stage, the coast down stage, and the load varying state of the gas turbine.

DESCRIPTION OF THE PREFERRED EMBODIMENTS

Embodiments of the present invention will be described below with reference to the drawings.

First Embodiment

Figure 1:
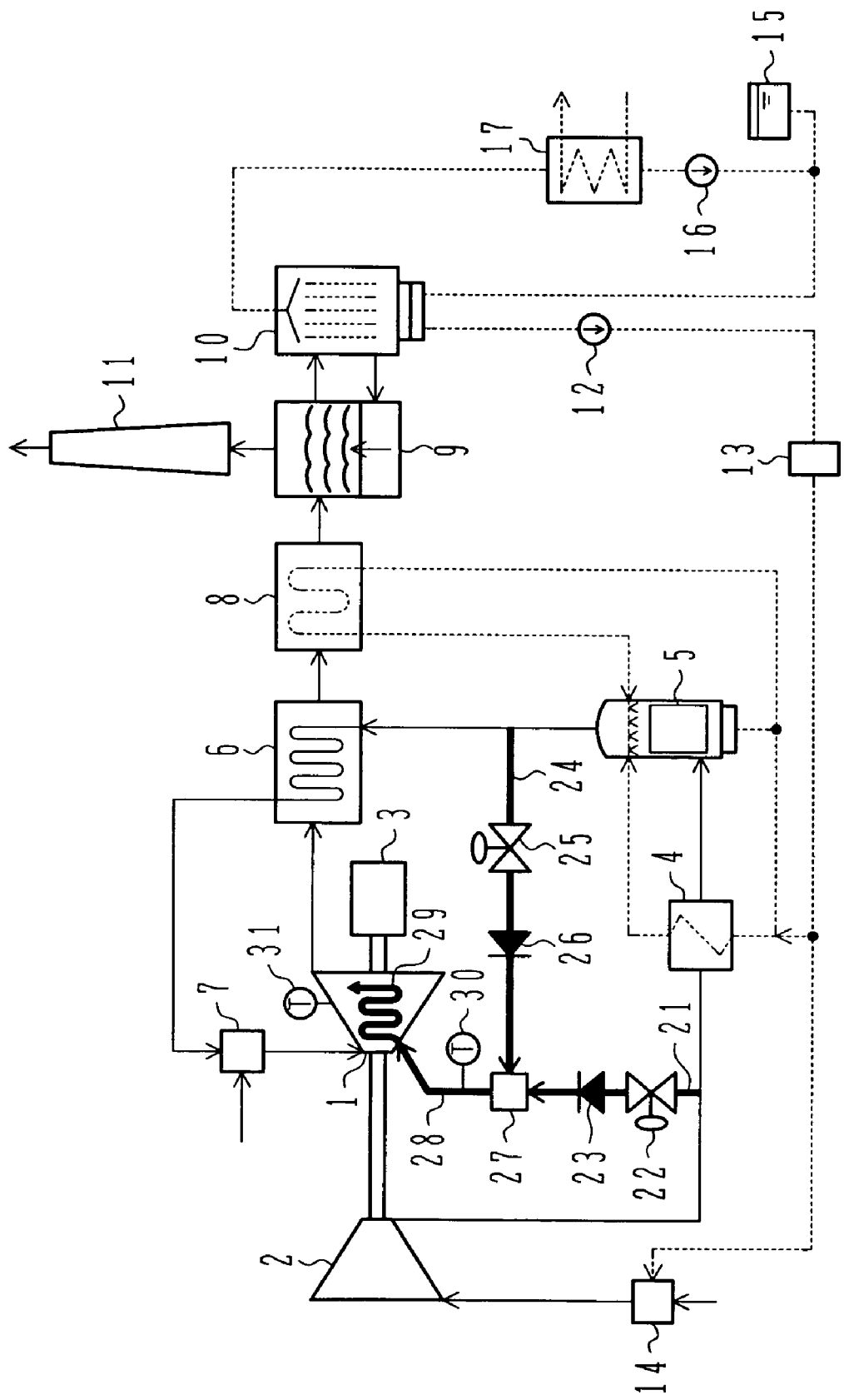
FIG. 1 is a block diagram of an advanced humid air turbine power plant according to a first embodiment of the present invention.

FIG. 1 is a block diagram of an advanced humid air turbine power plant according to a first embodiment of the present invention. In FIG. 1, a solid line represents a gas passage. The gas passage includes equipment disposed therein and they are collectively referred to as an "air line" in the following description. Also, a dotted line in FIG. 1 represents a water passage. The water passage includes equipment disposed therein and they are collectively referred to as a "humidifying line". Further, a fat solid line in FIG. 1 represents a coolant passage that is a feature of the present invention. The coolant passage includes equipment disposed therein and they are collectively referred to as a "cooling line" in the following description.

The air line will first be described below. As shown in FIG. 1, the advanced humid air turbine power plant comprises a gas turbine (GT) 1, a compressor 2, and a generator 3, which are coupled to one shaft. Atmospheric air is supplied to the compressor 2 and, in a rated load operating state, the compressor 2 produces high-pressure compressed air at a temperature of about 300° C. under a pressure of about 2000 Pa. The compressed air is cooled in an air cooler 4 to about 100° C. and is then supplied to a humidifying tower 5 that is installed to serve as a humidifying unit. In the humidifying tower 5, the compressed air is added with moisture and becomes humidified air having increased humidity, an increased volume, and a temperature of about 150° C. The humidified air exiting the humidifying tower 5 is heated in a recuperator 6 to near 550° C. by heat exchange with exhaust gases from the gas turbine 1. The heated humidified air is burnt in a combustor 7 together with fuel and is converted to high-temperature, high-pressure combustion gases having a temperature of not lower than 1300° C. and a pressure of about 1900 Pa. The combustion gases are supplied to the gas turbine 1, thereby driving the generator 3 that is coupled to the gas turbine 1. Burning of the humidified air causes the combustion gases to contain a larger amount of moisture and to have an increased mass flow rate. Also, because steam has larger specific heat than air and can retain a larger amount of energy therein, the gas turbine 1 is able to produce a higher output than an ordinary gas turbine. The combustion gases having been subjected to expansion and a pressure drop in the gas turbine 1 are discharged as exhaust gases, which still have a sufficiently high level of temperature. Therefore, the exhaust gases are used to perform heat exchange with the humidified air in the recuperator 6 and to further perform heat exchange with water in an economizer 8 for recovery of thermal energy. The exhaust gases exiting the economizer 8 is cooled in an exhaust gas reheater 9 and then supplied to a water recovering unit 10. In the water recovering unit 10, water at low temperature is sprayed to the exhaust gases to lower the temperature of the exhaust gases, whereby the moisture in the exhaust gases is condensed and recovered. The exhaust gases containing a part of the moisture having not been condensed is introduced again to the exhaust gas reheater 9, and the reheated exhaust gases are released to the atmosphere through a stack 11.

Next, the humidifying line will be described. The humidifying line is in direct contact with the gases in the air line at three locations, i.e., the humidifying tower 5, the water recovering unit 10, and a humidifier 14. In the humidifying tower 5 and the humidifier 14, water is introduced to the gases from the humidifying line, and water is recovered from the gases in the water recovering unit 10. Those operations will be described below one by one.

In the humidifying tower 5, the high-temperature water heated in both the air cooler 4 and the economizer 8 is sprayed to come into countercurrent contact with the compressed air. This causes a part of the high-temperature water to evaporate (or vaporize), whereby the temperature and humidity of the compressed air are increased to produce humidified air. The high-temperature water having not evaporated falls down inside the humidifying tower 5 while being deprived of the latent heat of evaporation. Finally, the high-temperature water is cooled to a level not higher than the temperature of the supplied air, and then resides as liquid-phase water at the bottom of the humidifying tower 5. The liquid-phase water is branched into two streams after exiting the humidifying tower 5. One stream of the liquid-phase water is supplied to the air cooler 4 for recovery of thermal energy from the compressed air, and the other stream of the liquid-phase water is supplied to the economizer 8 for recovery of thermal energy from the exhaust gases.

In the water recovering unit 10, water at a low temperature is sprayed to the exhaust gases to lower the temperature of the exhaust gases, whereby the moisture having been added to the compressed air in the humidifying tower 5 is condensed and recovered. A part of the moisture in the exhaust gases is released to the atmosphere without being recovered, while water is replenished from a cooling water tank 15 in amount corresponding to the amount by which the moisture has been released. As a result, the amount of water replenished from the exterior is minimized, and the efficiency of power generation is increased. A part of the recovered and replenished water is pressurized by a pump 12 and supplied to the air cooler 4 and the humidifier 14 in a branched way via a desalinating device 13. The water branched toward the air cooler 4 joins with the liquid-phase water from the humidifying tower 5, and after passing through the air cooler 4, the joined water is sprayed again as high-temperature water in the humidifying tower 5. On the other hand, the water branched toward the humidifier 14 is sprayed from the humidifier 14 as spray water added to air taken into the compressor 2. Further, the remaining part of the recovered water and the replenished water from the water recovering unit 10 is pressurized by a pump 16, and after being cooled in a cooler 17, it is supplied again to the water recovering unit 10 as water for cooling the exhaust gases.

Next, the cooling line will be described. The present invention is featured in cooling a high-temperature component of the gas turbine in stages of startup, low load and stop of the gas turbine, as well as in the event of an abnormality in the humidifying line, while the compressed air produced by the compressor 2 and the humidified air produced by the humidifying tower 5 are supplied in a switched manner with the equipment configuration described below.

A part of the compressed air introduced from the compressor 2 to the air cooler 4 is supplied, as air for cooling the high-temperature component of the gas turbine, to a mixer 27 via a compressed air supply pipe 21, a compressed air supply valve 22, and a check valve 23. The flow rate of the compressed air supplied to the air cooler 4 is adjusted by the compressed air supply valve 22. Also, a part of the humidified air having been added with moisture in the humidifying tower 5 is supplied to the mixer 27 via a humidified air supply pipe 24, a humidified air supply valve 25, and a check valve 26. The flow rate of the humidified air supplied through the humidified air supply pipe 24 is adjusted by the humidified air supply valve 25. The compressed air and the humidified air having been supplied to the air cooler 4 are mixed to produce cooling air that is supplied to a cooling channel 29 in the high-temperature component of the gas turbine through a cooling air supply pipe 28. The cooling air after cooling the high-temperature component is released into the gas turbine 1. Additionally, the compressed air supply valve 22 and the humidified air supply valve 25 are operated to smoothly open and close.

For the advanced humid air turbine power plant made up of the above-described air line, humidifying line and cooling line, a description is now made of operating methods in the start up stage, the coast down stage, the load varying state of the gas turbine, as well as in the event of an abnormality in the humidifying line. During the operation, the rotating speed and load of the gas turbine, the temperature, humidity and pressure of the coolant, and the metal temperature of the cooling channel 29 in the high-temperature component of the gas turbine are measured as gas turbine status variables. The rotating speed and load of the gas turbine can be measured in the generator 3, while the temperature, humidity and pressure of the coolant can be measured by a sensor 30. However, it is difficult to directly measure the metal temperature of the cooling channel 29. For that reason, a sensor 31 is disposed in the high-temperature component of the gas turbine to measure the air temperature at the side of turbine wheels from the stationary side, and the metal temperature of the cooling channel 29 is estimated from a measured value.

Figure 2:
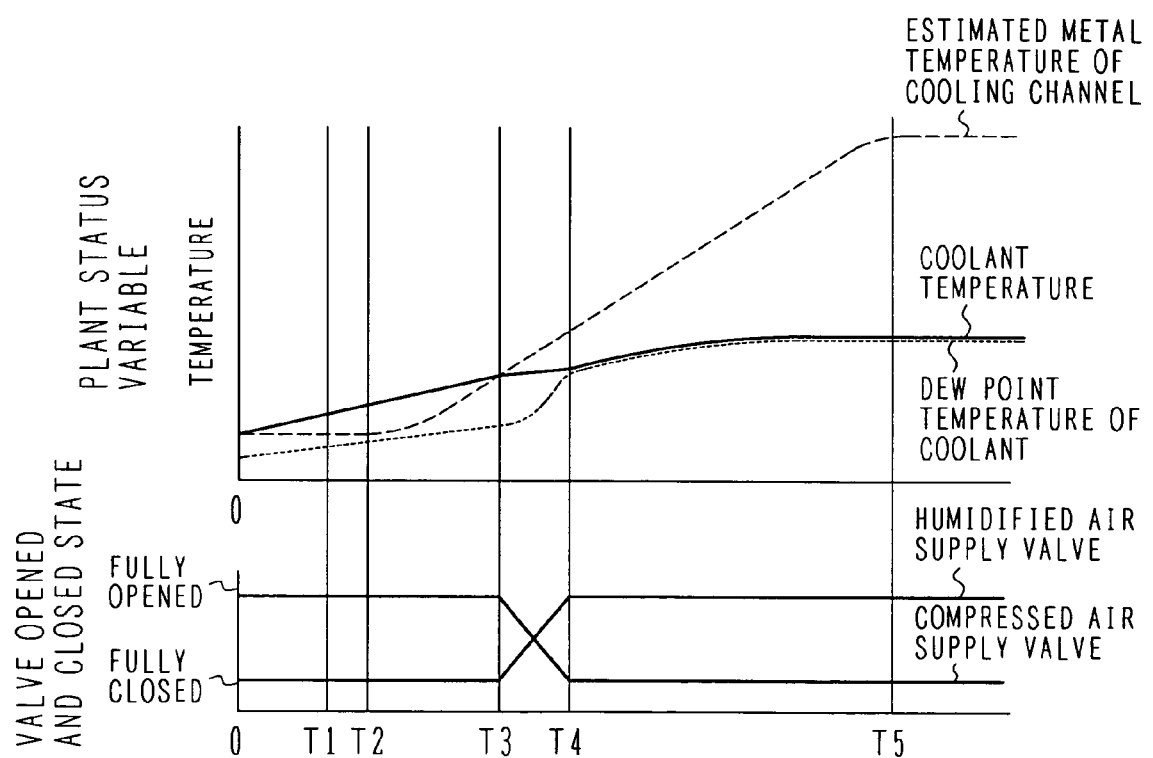
FIG. 2 is a chart for explaining a power plant operating method in a start up stage and a load increasing stage in the present invention.

The operating method in the start up stage and the load increasing stage of the gas turbine will be described with reference to FIG. 2. First, at a time 0 when the gas turbine starts operation, the gas turbine and associated pipes are at low temperatures. If the humidified air is supplied in such a condition, there is a possibility that moisture in the humidified air may condense. Accordingly, the humidified air supply valve 25 is fully closed and the compressed air supply valve 22 is fully opened to supply only the compressed air. Immediately after the startup of the gas turbine, the rotating speed is increased by a starter. At a certain subsequent time T1, the combustor 7 is ignited and the estimated metal temperature of the cooling channel 29 based on the measurement by the sensor 31 starts to rise. Also, at the time T1, the gas turbine is in a condition where the humidified air used for combustion is not yet supplied with intent to stabilize the ignition.

The supply of the humidified air used for combustion is started at a time T2 when the combustion in the combustor 7 has been stabilized. Because of the valve opening and closing being held in the same states as those mentioned above at this time, however, the humidified air is not yet supplied to the cooling channel 29 in the high-temperature component of the gas turbine, and only the compressed air not passing through the air cooler 4 flows through the cooling channel 29. Under a condition where the gas turbine is not sufficiently warmed up in the start up stage and the load increasing stage, the metal temperature of the cooling channel 29 may be lower than the dew point of the humidified air and the moisture in the humidified air may condense. Such a possibility is avoided by allowing only the compressed air to flow through the cooling channel 29. Further, because the compressed air before entering the air cooler 4 has a higher temperature than the humidified air exiting the humidifying tower 5, the temperature of the cooling channel 29 rises to accelerate warming-up of the gas turbine.

Then, at a time T3, the estimated metal temperature of the cooling channel 29 exceeds the temperature of the coolant. At this time T3, the warming-up of the gas turbine is regarded as being completed, whereupon the compressed air supply valve 22 is started to close and the humidified air supply valve 25 is started to open simultaneously. In response to that valve closing and opening, a proportion of the compressed air in the coolant starts to decrease and a proportion of the humidified air in the coolant starts to increase. As compared with the compressed air, the humidified air has a lower temperature and a higher cooling capability because the humidified air is cooled in the air cooler 4. Accordingly, a thermal shock imposed on the high-temperature component of the gas turbine can be suppressed by starting the switching-over in supply of the coolant at the time T3 when the difference between the metal temperature of the cooling channel 29 and the coolant temperature is small. In addition, the valve opening and closing operations are gradually performed so that the temperature of the coolant exiting the mixer 27 is not abruptly changed and the thermal shock imposed on the high-temperature component of the gas turbine is suppressed.

At a time T4, the compressed air supply valve 22 is fully closed and the humidified air supply valve 25 is fully opened, thus causing only the humidified air to flow through the high-temperature component of the gas turbine. After the time T4, the turbine inlet temperature rises, but the temperature in the high-temperature component of the gas turbine is suppressed to be not higher than an allowable value because the high-temperature component of the gas turbine is cooled by the humidified air having a higher cooling capability. At a time T5, the gas turbine comes into a rated load operation with a load of 100% while maintaining the valve states of opening and closing as they are.

As described above, by switching over the coolant at the time when the estimated metal temperature of the cooling channel 29 exceeds the temperature of the coolant in the cooling air supply pipe 28, it is possible to completely avoid the condensation of moisture inside the cooling channel in the start up stage and the load increasing stage of the gas turbine, and to realize a shift to the rated load operation without imposing the thermal shock on the high-temperature component of the gas turbine.

While, in this embodiment, the warming-up of the gas turbine is regarded as being completed at the time T3 when the estimated metal temperature of the cooling channel 29 exceeds the coolant temperature measured by the sensor 30 in the start up stage and the load increasing stage of the gas turbine, the sensor 30 may be disposed at an outlet of the humidifying tower 5, as an alternative, to employ the outlet temperature of the humidifying tower 5 instead of the coolant temperature.

Also, in this embodiment, after the coolant has been switched over in the start up stage and the load increasing stage of the gas turbine, the compressed air supply valve 22 is fully closed and the humidified air supply valve 25 is fully opened, whereby the cooling mode is switched over from the cooling with only the compressed air to the cooling with only the humidified air. However, because the temperature of the humidified air is at a level as low as 150° C., the switching-over of the cooling mode gives rise to a possibility that a steep temperature gradient may be generated in individual high-temperature members of the gas turbine, thus causing increased thermal stresses in the high-temperature members of the gas turbine. To avoid such a possibility, the operating method can be modified as follows. When the coolant temperature measured by the sensor 30 is too much lower than the estimated metal temperature of the cooling channel 29, which is estimated from the temperature at the side of the turbine wheels measured by the sensor 31 (namely, when the coolant temperature is lower than a predetermined value set relative to the estimated metal temperature of the cooling channel 29), the compressed air supply valve 22 is held in a partly opened state so that the humidified air is mixed with the compressed air having a relatively high temperature to raise the temperature of the coolant flowing through the cooling channel 29 in the high-temperature component of the gas turbine.

Figure 3:
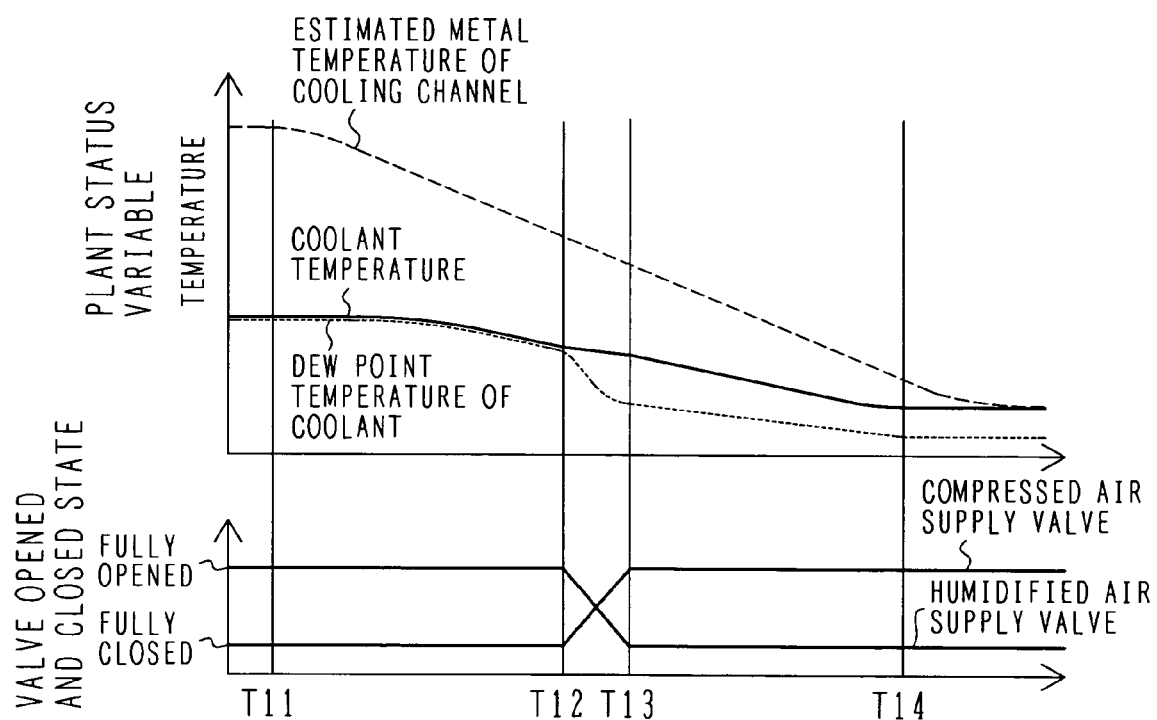
FIG. 3 is a chart for explaining a power plant operating method in a load decreasing stage and a coast down stage in the present invention.

Next, the operating method in the load decreasing stage and the coast down stage of the gas turbine will be described with reference to FIG. 3. In the rated load operation, the compressed air supply valve 22 is fully closed and the humidified air supply valve 25 is fully opened so that the coolant exiting the mixer 27 is all the humidified air. When the load starts to decrease at a time T11, the gas turbine comes, at a certain subsequent time T12, into a state where the high-temperature component of the gas turbine can be sufficiently cooled with the compressed air having a lower cooling capability than the humidified air. At this time T12, the compressed air supply valve 22 is started to open and the humidified air supply valve 25 is started to close simultaneously. Then, at time T13, the compressed air supply valve 22 is fully opened and the humidified air supply valve 25 is fully closed. Accordingly, the coolant flowing through the cooling channel 29 is only the compressed air after the time T13, and the operation can be performed without causing condensation of moisture in the cooling channel. The gas turbine 1 is stopped at a time T14. If the humidified air remains in the cooling channel 29, there is a possibility that the inner surface of the cooling channel 29 may be oxidized and corroded due to the moisture and oxygen both contained in the air remaining in the cooling channel after the stop of the gas turbine. In this embodiment, however, the cooling air supplied after the time T13 is only the compressed air, and the humidified air in the cooling channel 29 is all purged out at the time T14. As a result, the corrosion of the cooling channel can be suppressed.

Figure 4:
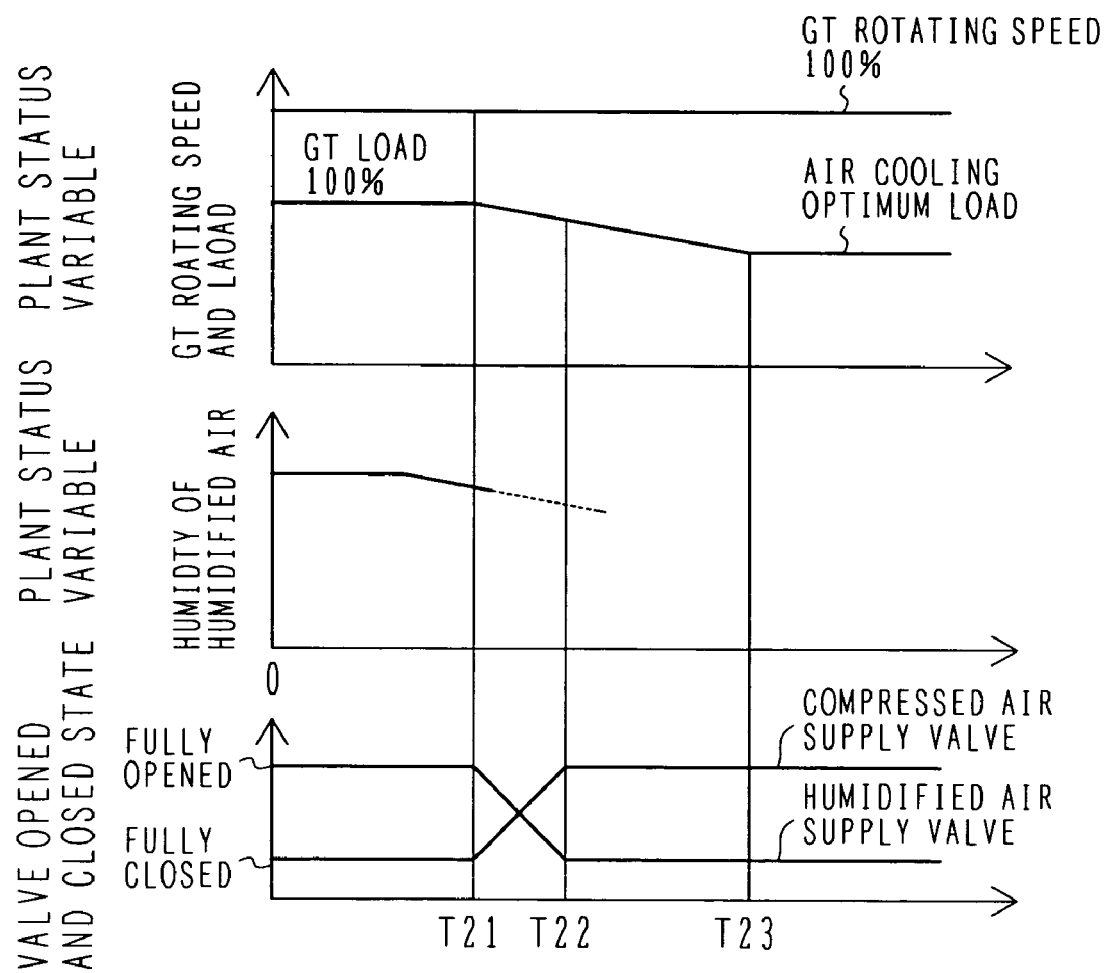
FIG. 4 is a graph for explaining a power plant operating method in the event of an abnormality in a humidifying line.

Next, the operating method in the event of an abnormality in the humidifying line will be described with reference to FIG. 4. If the amount of water added in the humidifying tower 5 is reduced due to the occurrence of an abnormality in a sprayer, or if a pressure loss in the humidifying tower 5 is increased due to clogging, for example, the high-temperature component of the gas turbine cannot be sufficiently cooled. Accordingly, if such an abnormal condition is left as it is, the high-temperature component of the gas turbine is overheated. To overcome that problem, the coolant is switched over from the humidified air to the compressed air at the time when the humidity or pressure of the humidified air measured by the sensor 30 is reduced below a threshold indicating the abnormality in the humidifying line, thereby shifting the gas turbine to the operating mode with the air cooling.

In this embodiment, it is assumed that the humidity of the humidified air measured by the sensor 30 has dropped in the rated load state. When the humidity of the humidified air measured by the sensor 30 has dropped to be lower than the threshold, this is determined as indicating the occurrence of an abnormality. At that time T21, the compressed air supply valve 22 is started to open at once and the humidified air supply valve 25 is started to close simultaneously. Further, at the same time T21, the load of the gas turbine is started to decrease so as to lower the temperature in the high-temperature component of the gas turbine. Then, upon reaching a time T22 at which the gas turbine comes into a load state where the temperature in the high-temperature component of the gas turbine can be held not higher than the allowable value by the cooling with the compressed air, the compressed air supply valve 22 is fully opened and the humidified air supply valve 25 is fully closed.

Second Embodiment

Figure 5:
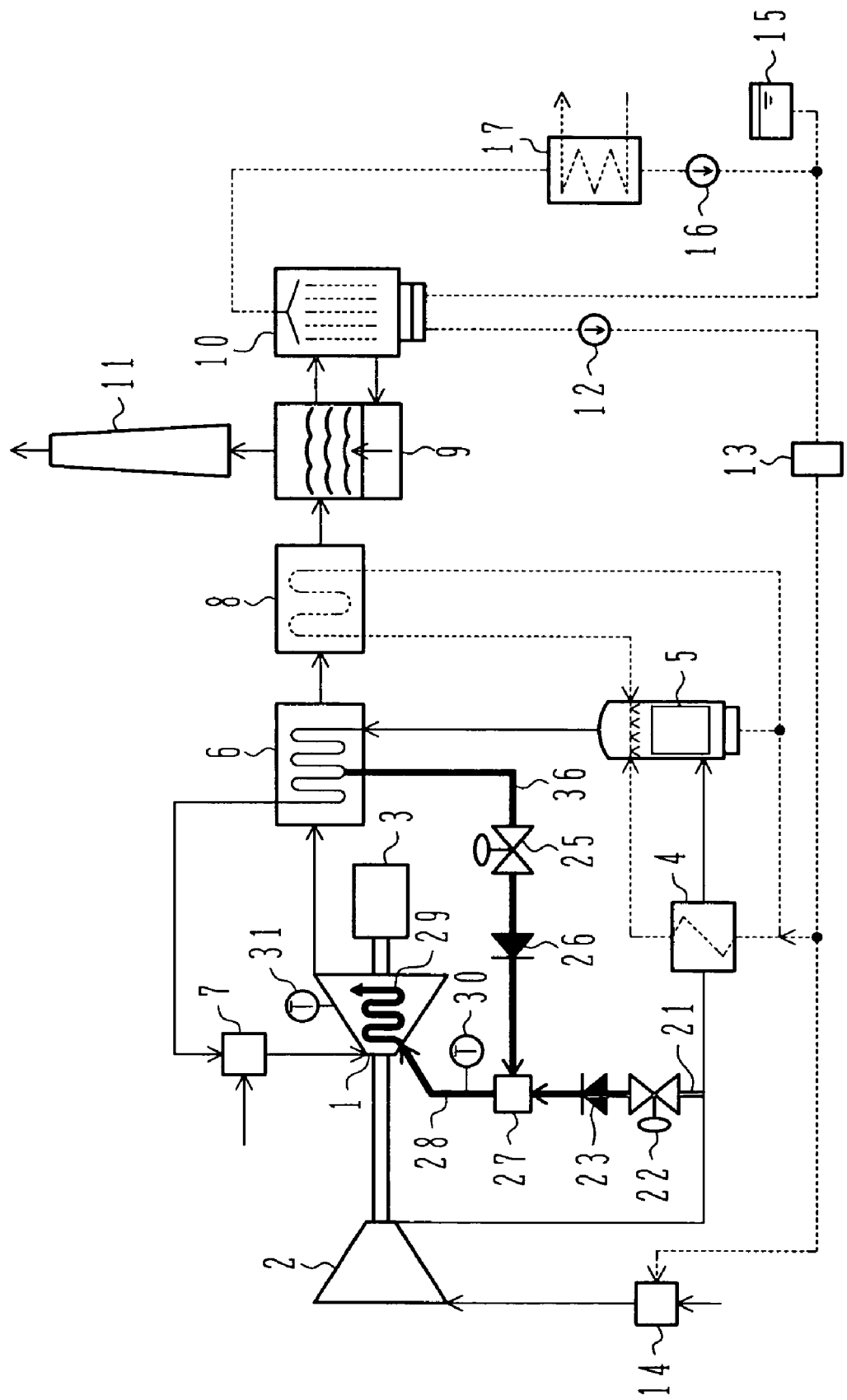
FIG. 5 is a block diagram of an advanced humid air turbine power plant according to a second embodiment of the present invention.

FIG. 5 is a block diagram of an advanced humid air turbine power plant according to a second embodiment of the present invention. A description of the same components as those in FIG. 1 is omitted here. While the first embodiment of FIG. 1 utilizes, as the humidified air that is used as air for cooling the high-temperature component of the gas turbine, the humidified air supplied from the humidifying tower 5 to the recuperator 6, this second embodiment utilizes the humidified air having a temperature raised in the recuperator 6. Practically, a humidified air supply pipe 36 is provided to branch a part of the humidified air from an intermediate position of a channel in the recuperator 6. The humidified air branched by the humidified air supply pipe 36 is supplied to the mixer 27 via the humidified air supply valve 25 and the check valve 26.

The temperature of the humidified air exiting the humidifying tower 5 is lower than the temperature of the compressed air exiting the compressor 2, and a thermal shock is imposed on the high-temperature component of the gas turbine when two kinds of coolants having a temperature difference therebetween are switched over from one to the other. In view of such a point, this second embodiment is featured in using, as the coolant for cooling the high-temperature component of the gas turbine, a part of the humidified air having entered the recuperator 6 and having a temperature raised by heat exchange with the exhaust gases from the gas turbine 1, thereby reducing the temperature difference between the humidified air and the compressed air. As a result, when the coolant is switched over to the humidified air from the compressed air supplied through the compressed air supply pipe 21, it is possible to suppress the thermal shock imposed on the high-temperature component of the gas turbine, to cut the time required for the operations of opening and closing the compressed air supply valve 22 and the humidified air supply valve 25, and to smoothly switch over the coolant from one to the other.

Third Embodiment

Figure 6:
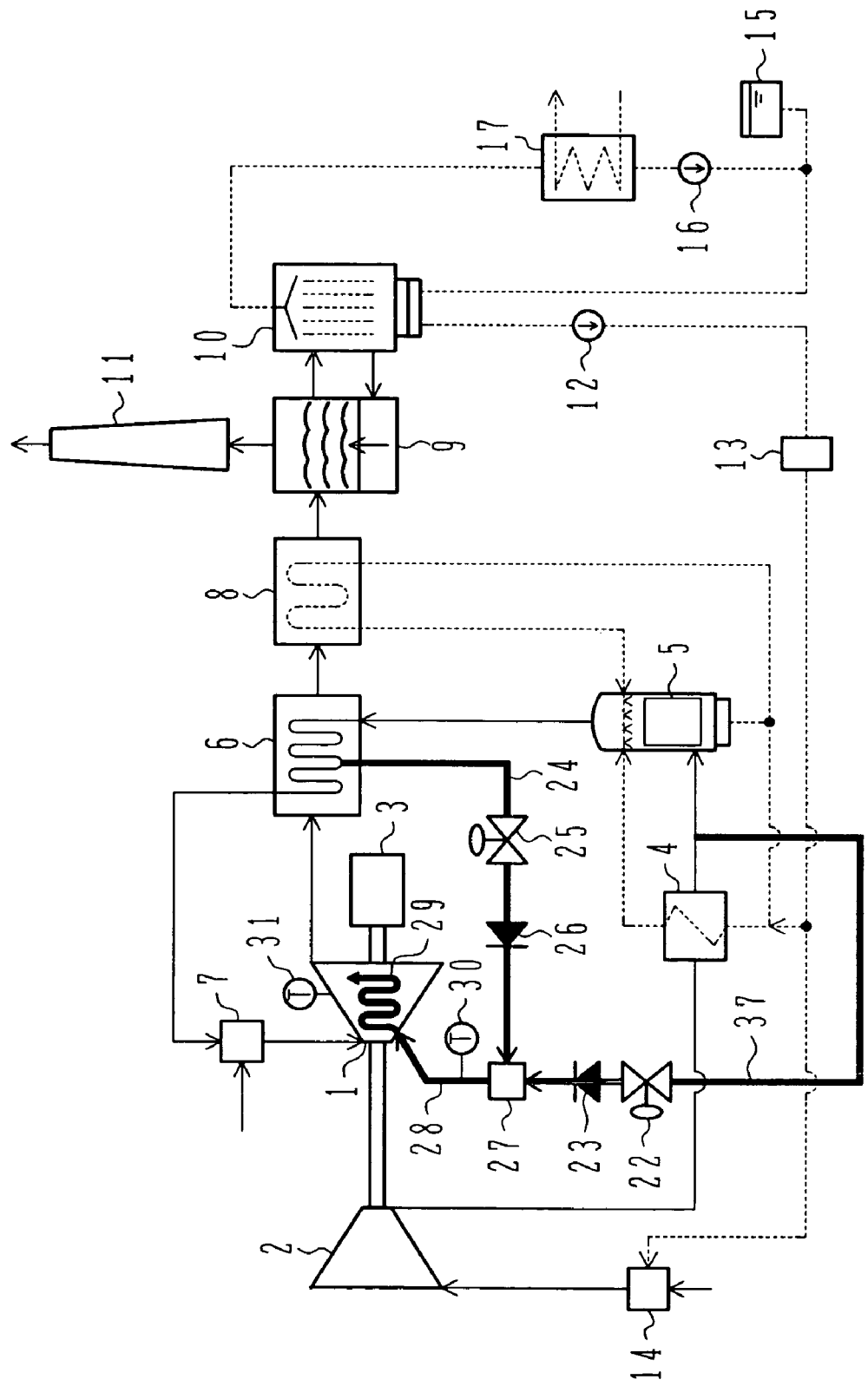
FIG. 6 is a block diagram of an advanced humid air turbine power plant according to a third embodiment of the present invention.

FIG. 6 is a block diagram of an advanced humid air turbine power plant according to a third embodiment of the present invention. While the first embodiment of FIG. 1 utilizes, as the compressed air that is used as air for cooling the high-temperature component of the gas turbine, the compressed air supplied from the compressor 2 to the air cooler 4, this third embodiment supplies the compressed air of which temperature has been reduced in the air cooler 4. Practically, a compressed air supply pipe 37 is provided to branch a part of the compressed air to a high-temperature component cooling channel 29 (provided by the cooling air supply air 28) from an intermediate position of a passage through which the compressed air having been cooled in the air cooler 4 is supplied to the humidifying tower 5. The compressed air branched by the compressed air supply pipe 37 is supplied to the mixer 27 via the compressed air supply valve 22 and the check valve 23.

Immediately after the occurrence of an abnormality in the humidifying line, the cooling capability of the coolant lowers while the high-temperature component of the gas turbine still remains at a level of high temperature, thus further raising the temperature in the high-temperature component of the gas turbine. It is therefore desired that, when the coolant is switched over from the humidified air to the compressed air, the temperature of the compressed air be as low as possible. From that point of view, this third embodiment is featured in employing, as the coolant, a part of the compressed air exiting the air cooler 4, and supplying, to the high-temperature component of the gas turbine, the compressed air having a lower temperature than that before passing through the air cooler 4.

Fourth Embodiment

Figure 7:
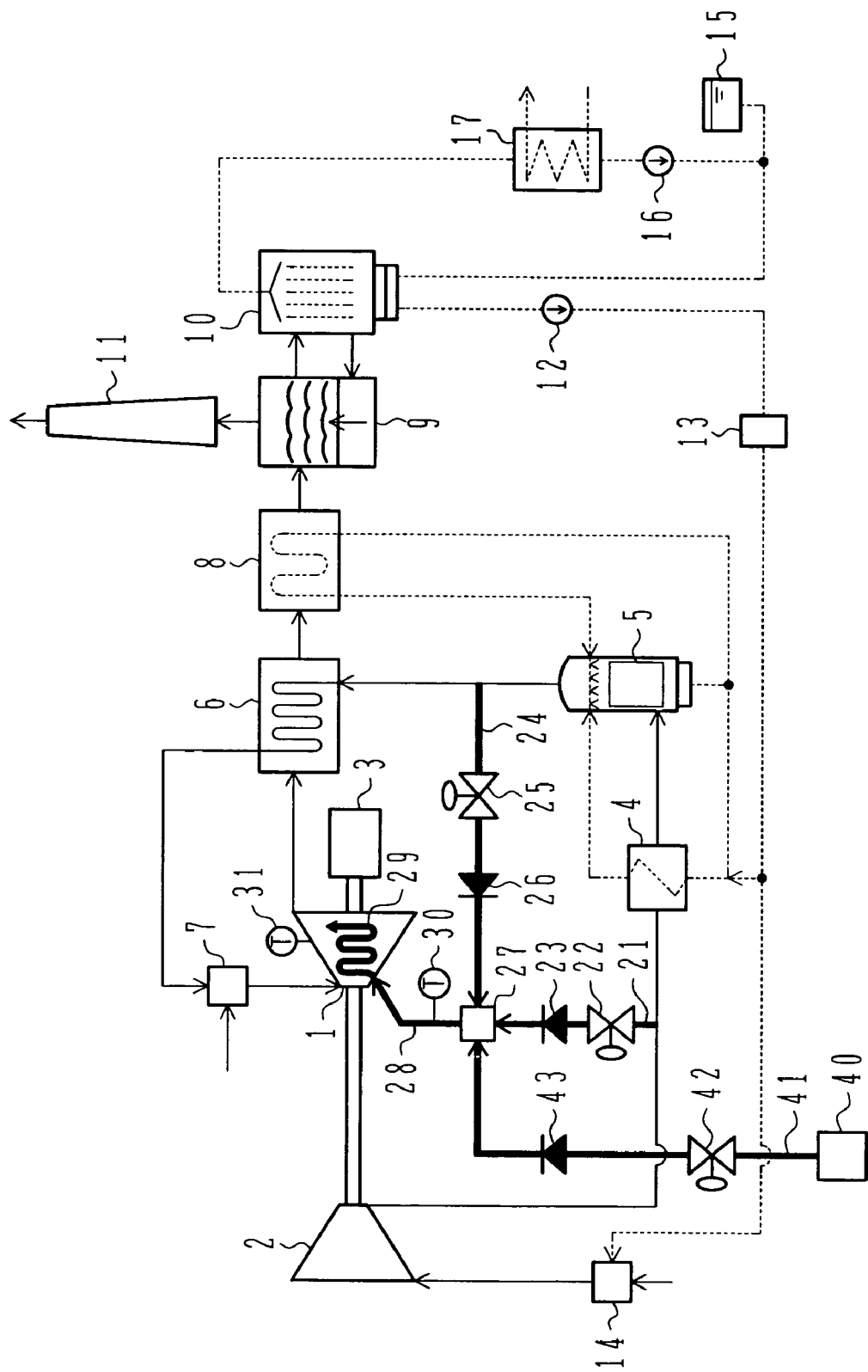
FIG. 7 is a block diagram of an advanced humid air turbine power plant according to a fourth embodiment of the present invention.

FIG. 7 is a block diagram of an advanced humid air turbine power plant according to a fourth embodiment of the present invention. In addition to the system configuration of FIG. 1, this fourth embodiment further includes an inert gas supply line as a corrosion preventive means in the gas turbine cooling line. Practically, an inert gas supply pipe 41 is provided to supply an inert gas from an inert gas supply source 40 to the mixer 27, and an inert gas supply valve 42 and a check valve 43 are disposed in the inert gas supply pipe 41. While the inert gas supply pipe 41 is connected to the mixer 27 in this fourth embodiment shown in FIG. 7, the inert gas supply pipe 41 may be connected to an intermediate position of the humidified air supply pipe 24 or the compressed air supply pipe 21. In that case, the inert gas supply pipe 41 is preferably connected to the supply pipe downstream of the check valve 23, 26 or of the humidified air supply valve 25 or the compressed air supply valve 22.

If the humidified air remains in the cooling channel 29 in the high-temperature component of the gas turbine after the stop of the gas turbine, there is a possibility that the inner surface of the cooling channel 29 may be oxidized and corroded due to the moisture and oxygen both contained in the remaining air. Such a possibility of corrosion can be suppressed by switching over the coolant from the humidified air to the compressed air as in the first embodiment. Further, in this fourth embodiment, the coolant is switched over from the compressed air to the inert gas supplied from the inert gas supply pipe 41 so that the moisture and oxygen possibly causing the corrosion are completely purged out of the cooling channel.

Figure 8:
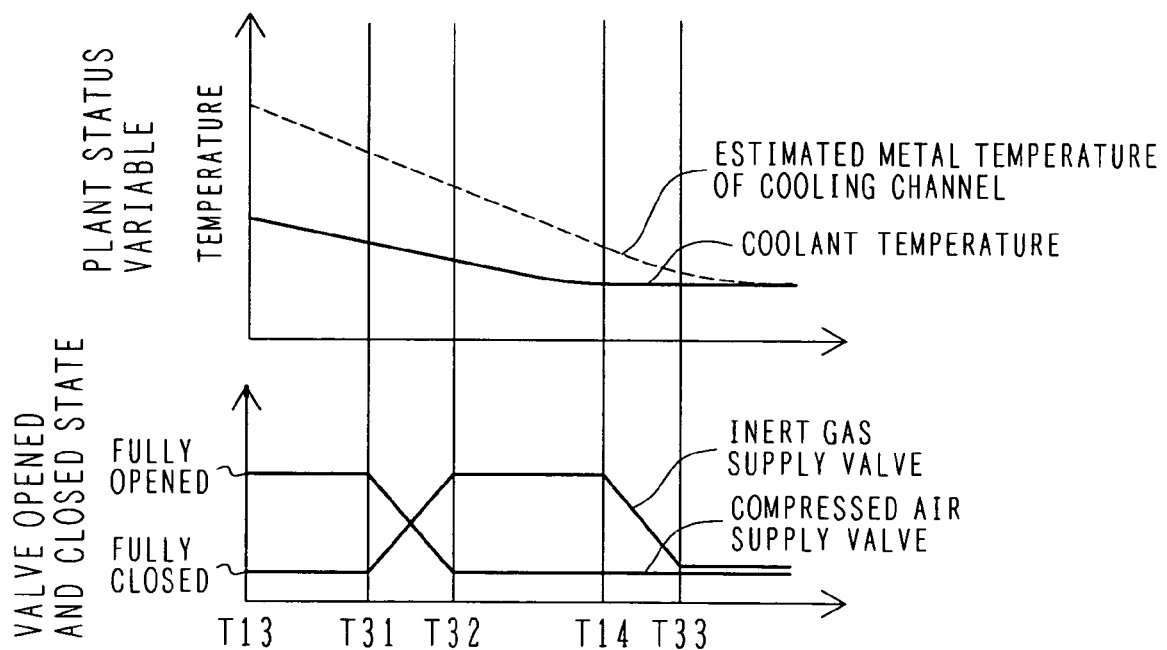
FIG. 8 is a chart for explaining a power plant operating method in the start up stage and the load increasing stage in the fourth embodiment.

An operating method in the stage of stopping the gas turbine according to the fourth embodiment will be described below with reference to FIG. 8. At a time T13 in FIG. 8, the gas turbine is in a state where the cooling air supplied to the high-temperature component is switched over from the humidified air to the compressed air. At this time, the compressed air supply valve 22 is fully opened, while the humidified air supply valve 25 and the inert gas supply valve 42 are both fully closed. At a certain subsequent time T31, the compressed air supply valve 22 is started to close and the inert gas supply valve 42 is started to open simultaneously. Then, at time T32, the compressed air supply valve 22 is fully closed and the inert gas supply valve 42 is fully opened, whereupon the coolant flowing through the cooling channel 29 is switched over from the compressed air to the inert gas. During a period from the time T31 to a time T14 at which the gas turbine is stopped, the compressed air in the cooling channel 29 is completely purged out by the inert gas. Finally, the inert gas supply valve 42 is started to close at a time T14 and then fully closed at a time T33. Thus, the moisture and oxygen possibly causing the corrosion can be effectively completely purged out of the cooling channel by supplying a small amount of inert gas.

As described above in connection with the embodiments, the present invention is featured in having the function of switching over the cooling mode between cooling with the humidified air and cooling with the compressed air in the start up stage, the load increasing stage, the load decreasing stage and the coast down stage of the gas turbine, as well as in the event of an abnormality in the humidifying line. In the start up stage and the load increasing stage of the gas turbine, the compressed air is supplied to accelerate warming-up of the cooling channel in the high-temperature component of the gas turbine and to lower the dew point of the coolant, thereby preventing condensation of the moisture. Also, by supplying the compressed air in the coast down stage and the load decreasing stage of the gas turbine, the condensation of the moisture can be similarly prevented. Further, by utilizing the compressed air as a purge gas, it is possible to suppress the corrosion that may be caused after the stop of the gas turbine. In the event of an abnormality in the humidifying line, by employing the compressed air as an auxiliary coolant, the operation of the gas turbine can be continued without increasing a thermal load imposed on the high-temperature component of the gas turbine.

As a result, according to the present invention, an improved gas turbine using the humidified air as a coolant for cooling the high-temperature component can be realized.

What is claimed is:

1. An advanced humid air turbine power plant comprising a compressor for compressing air, a humidifying tower for humidifying compressed air introduced from said compressor, a combustor for burning fuel and humidified air supplied from said humidifying tower, a gas turbine driven by combustion gases generated in said combustor, a recuperator for performing heat exchange between exhaust gases discharged from said combustor and the humidified air supplied to said combustor, a compressed air supply line for supplying, as cooling air, the compressed air generated by said compressor to a high-temperature component of said gas turbine, and a humidified air supply line for supplying the humidified air added with moisture in said humidifying tower to the high-temperature component of said gas turbine, wherein said power plant further comprises a compressed air supply valve for adjusting a flow rate of the compressed air supplied, as cooling air, to the high-temperature component of the gas turbine via said compressed air supply line, and a humidified air supply valve for adjusting a flow rate of the humidified air supplied, as cooling air, to the high-temperature component of the gas turbine via said humidified air supply line, the humidified air being the sole delivered coolant during normal operation under load;

wherein in the event of an abnormality in said humidified air supply line, a supply source of the gas turbine cooling air is switched over from said humidified air supply line to said compressed air supply line and a load of the gas turbine is decreased.

2. The advanced humid air turbine power plant according to claim 1, wherein, in a start up stage or a load increasing stage of said gas turbine, a supply source of the gas turbine cooling air is switched over from said compressed air supply line to said humidified air supply line.

3. The advanced humid air turbine power plant according to claim 1, wherein, in a start up stage or a load increasing stage of said gas turbine, a supply source of the gas turbine cooling air is switched over from said compressed air supply line alone to both of said humidified air supply line and said compressed air supply line.

4. The advanced humid air turbine power plant according to claim 1, wherein, in a start up stage or a load increasing stage of said gas turbine, a supply source of the gas turbine cooling air is switched over from said compressed air supply line to said humidified air supply line when a temperature in the high-temperature component of said gas turbine or an estimated temperature in the high-temperature component of said gas turbine obtained from a temperature at a location substituted for the high-temperature component of said gas turbine rises above a coolant temperature.

5. The advanced humid air turbine power plant according to claim 1, wherein, in a load decreasing stage or a coast down stage of said gas turbine, a supply source of the gas turbine cooling air is switched over from said humidified air supply line to said air compressed supply line.

6. The advanced humid air turbine power plant according to claim 1, wherein, the load of the gas turbine is decreased and the gas turbine comes into a load state where the temperature in the high-temperature component of the gas turbine can be held not higher than the allowable value by the cooling with only compressed air from the compressed air supply line.

7. The advanced humid air turbine power plant according to claim 1, wherein, in the event of an abnormality in said humidified air supply line, a supply source of the gas turbine cooling air is switched over from said humidified air supply line to said compressed air supply line when at least one of humidity and pressure of the humidified air reduces to a level not higher than a certain threshold.

8. The advanced humid air turbine power plant according to claim 1,
wherein said power plant further comprises an inert gas supply line for supplying, as coolant, an inert gas to the high-temperature component of said gas turbine.

9. The advanced humid air turbine power plant according to claim 8, wherein, in a load decreasing stage or a coast down stage of said gas turbine, a supply source of the gas turbine cooling air is switched over from said compressed air supply line or said humidified air supply line to said inert gas supply line.

* * * * *